US009648159B2

(12) United States Patent
Ding et al.

(10) Patent No.: US 9,648,159 B2
(45) Date of Patent: May 9, 2017

(54) SINGLE-PDP DUAL STACK SERIAL DIALING METHOD AND SYSTEM

(75) Inventors: Xiaolei Ding, Shenzhen (CN); Wei Zheng, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 176 days.

(21) Appl. No.: 14/398,284

(22) PCT Filed: Jul. 18, 2012

(86) PCT No.: PCT/CN2012/078829
§ 371 (c)(1),
(2), (4) Date: Dec. 31, 2014

(87) PCT Pub. No.: WO2013/163847
PCT Pub. Date: Nov. 7, 2013

(65) Prior Publication Data
US 2015/0117311 A1    Apr. 30, 2015

(30) Foreign Application Priority Data

May 2, 2012  (CN) .......................... 2012 1 0133506

(51) Int. Cl.
*H04W 80/04*  (2009.01)
*H04W 76/02*  (2009.01)
(Continued)

(52) U.S. Cl.
CPC .......... *H04M 3/02* (2013.01); *H04L 65/1069* (2013.01); *H04M 1/2535* (2013.01); *H04M 3/44* (2013.01);
(Continued)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS

2001/0027490 A1*  10/2001  Fodor ................. H04L 12/5695
                                                                    709/238
2006/0199594 A1*  9/2006  Gundu .................. G10L 19/167
                                                                    455/452.2
(Continued)

FOREIGN PATENT DOCUMENTS

CN        101997934 A       3/2011
CN        102421201 A       4/2012
(Continued)

OTHER PUBLICATIONS

International Search Report (Form PCT/ISA/210) for PCT/CN2012/078829, mailed Feb. 7, 2013.
(Continued)

*Primary Examiner* — Marcus R Smith
*Assistant Examiner* — Prenell Jones
(74) *Attorney, Agent, or Firm* — Koppel, Patrick, Heybl & Philpott

(57) ABSTRACT

A method and system for single-PDP dual-stack serial dialing is provided. A mobile terminal sets a single-PDP dual-stack serial dialing parameter according to a parameter setting command transmitted by a host; then the mobile terminal initiates a PDP activation request to a mobile communication network according to a first dialing instruction transmitted by the host and the configured single-PDP dual-stack serial dialing parameter, acquires activation response information fed back by the mobile communication network, generates dialing response information according to the activation response information, and feeds back the dialing response information to the host, wherein the dialing response information includes cause reference information. And after receiving the dialing response information, the host can acquire a specific condition of the current mobile network according to the cause reference information included in the dialing response information to determine a dialing mode.

17 Claims, 3 Drawing Sheets

(51) Int. Cl.
*H04M 3/02* (2006.01)
*H04M 1/253* (2006.01)
*H04M 3/44* (2006.01)
*H04L 29/06* (2006.01)
*H04M 1/725* (2006.01)
*H04L 29/12* (2006.01)
*H04W 88/06* (2009.01)
*H04W 92/08* (2009.01)

(52) U.S. Cl.
CPC ....... *H04W 76/022* (2013.01); *H04L 61/6086* (2013.01); *H04M 1/72561* (2013.01); *H04W 88/06* (2013.01); *H04W 92/08* (2013.01)

(56) References Cited

U.S. PATENT DOCUMENTS

2011/0038372 A1  2/2011  Wijayanathan et al.
2012/0182934 A1* 7/2012  Diachina ............... H04W 4/005
                                              370/328
2014/0237128 A1  8/2014  Yue
2015/0256381 A1* 9/2015  Sun .................... H04W 76/027
                                              370/329

FOREIGN PATENT DOCUMENTS

EP        2 744 178 A1 * 11/2011  ............ H04L 29/12
WO    WO 2011018627 A2    3/2011

OTHER PUBLICATIONS

Supplementary European Search Report from Appl. No. EP12875868. dated Mar. 17, 2015.
"3$^{rd}$ Generation Partnership Project: Technical Specification Group Core Network and Terminals: AT command set for User Equipment (UE)(Release 11)" 3GPP Standard; 3GPP TS 27.007. 3$^{rd}$ Generation PARPP), Mobile Competence Centre: 650, Route Des Lucioles: F-06921 Sophia-Antipolis Cedex; France, vol. CT WG1, No. V11. 2,0, Mar. 13, 2012 (Mar. 13, 2010), pp. 1-272, XP050580165, [retrieved on Mar. 13, 2012]Chapters 1. 9.2.2.2. 10.1.1 and 10.1.10.

* cited by examiner

SINGLE-PDP DUAL STACK SERIAL DIALING METHOD AND SYSTEM

FIELD OF THE INVENTION

The present invention relates to the field of mobile communication, in particular to a method and system for single-Packet Data Protocol (PDP) dual-stack serial dialing.

BACKGROUND OF THE INVENTION

Compared with Internet Protocol version 4 (IPv4), Internet Protocol version 6 (IPv6) has many advantages. Either a $3^{rd}$ Generation Partnership Project (3GPP)-based Universal Mobile Telecommunication System (UMTS) or a $3^{rd}$ Generation Partnership Project 2 (3GPP2)-based Code Division Multiple Access 2000 (CDMA2000) system has already determined a development direction of IPv6. Particularly in a 3G IP Multimedia Sub-system (IMS) stage, a network system will be completely based on or compatible with IPv6. IPv6 has become a common basic protocol of the Internet and a mobile communication network. Under such a background, an application of IPv6 to a 3G network and a mobile terminal will become increasingly popular.

However, in a popularization process of IPv6 in the field of mobile communication, IPv4 will exist for quite a while, so the mobile terminal and network equipment often need to be compatible with both IPv4 and IPv6, namely to support IPv4 and IPv6 dual stacks. For the mobile terminal, support to the dual stacks means that it needs to activate a PDP context of a corresponding type according to a certain flow in a dialing process. The most common condition is that the terminal can try to activate a PDP of an IPv4v6 type, namely try to establish a single-PDP dual-stack connection. On a Personal Computer (PC), when the single-PDP dual-stack connection is established through the mobile terminal, the simultaneous transmission of IPv4 and IPv6 dialing instructions is required. However, if a communication mechanism between a host driver and the terminal under an operating system such as a Mac operating system adopts a synchronous communication mechanism, that is, the host driver and the terminal interact with each other in a serial mode, under such a condition, the serial transmission of two dialing instructions will cause the problem that a single-PDP dual-stack mode automatically returns to a dual-PDP dual-stack mode, and because a network environment of the mobile terminal is diversified, and the network may not support the single-PDP dual-stack mode, or does not support IPv6, IPv4 or the like, blind dialing will cause unnecessary dialing processing and a dialing failure to waste a system resource.

SUMMARY OF THE INVENTION

The present invention provides a single-PDP dual-stack serial dialing method and system, which can simplify a dialing flow, improve dialing efficiency and increase a utilization rate of a system resource.

According to one aspect of the present invention, a single-PDP dual-stack serial dialing method is provided, including the following steps that:

a mobile terminal sets a single-PDP dual-stack serial dialing parameter according to a parameter setting command transmitted by a host;

the mobile terminal initiates a PDP activation request to a mobile communication network according to a first dialing instruction transmitted by the host and the single-PDP dual-stack serial dialing parameter, and acquires activation response information fed back by the mobile communication network;

the mobile terminal generates dialing response information according to the activation response information, and feeds back the dialing response information to the host, wherein the dialing response information includes cause reference information; and the host determines a dialing mode according to the dialing response information.

In one embodiment of the present invention, the activation response information includes activation results and activation reference information, and that the mobile terminal generates the dialing response information according to the activation response information includes that:

the mobile terminal judges whether PDP activation is successful or not according to the activation results, generates dialing success response information or dialing failure response information according to the activation reference information if the PDP activation is successful, otherwise generates the dialing failure response information according to the activation reference information.

In one embodiment of the present invention, the activation reference information includes activated type information and denial cause information, and that the mobile terminal generates the dialing response information according to the activation reference information when the PDP activation is successful includes that:

the mobile terminal judges whether a type of an activated PDP is that requested by the first dialing instruction or not according to the activated type information, obtains the cause reference information according to the denial cause information if the type of the activated PDP is that requested by the first dialing instruction, generates the dialing success response information, otherwise judges whether the type of the activated PDP is an IPv4v6 type or not, obtains the cause reference information according to the denial cause information if the type of the activated PDP is the IPv4v6 type, generates the dialing success response information, the denial cause information including any cause at this moment, otherwise obtains the cause reference information according to the denial cause information, and generates the dialing failure response information.

In one embodiment of the present invention, the activation reference information includes the denial cause information, and that the mobile terminal generates the dialing failure response information according to the activation reference information when the PDP activation is failed includes that:

the mobile terminal judges whether a failure cause is that a PDP address or PDP type of the PDP activation request initiated according to the first dialing instruction is unknown or not according to the denial cause information, records the cause reference information to be "unknown PDP address or PDP type" if the failure cause is that the PDP address or PDP type of the PDP activation request initiated according to the first dialing instruction is unknown, otherwise records the cause reference information to be "unknown cause"; and the mobile terminal generates the dialing failure response information according to the recorded cause reference information.

In one embodiment of the present invention, the first dialing instruction is an IPv4 dialing instruction, and that the mobile terminal generates the dialing response information according to the activation reference information includes that:

if determining that the type of the activated PDP is an IPv4 type according to the activated type information, the mobile terminal judges whether a cause for not activating an IPv6 type is PDP type IPv4 only allowed or not according to the denial cause information, records the cause reference information to be "PDP type IPv4 only allowed" if the cause for not activating the IPv6 type is PDP type IPv4 only allowed, otherwise judges whether the cause for not activating the IPv6 type is single address bearers only allowed or not, records the cause reference information to be "single address bearers only allowed" if the cause for not activating the IPv6 type is single address bearers only allowed, also records the cause reference information to be "single address bearers only allowed" if the denial cause information does not include any cause, and generates the dialing success response information according to the obtained cause reference information; and if determining that the type of the activated PDP is not the IPv4 type requested by the first dialing instruction according to the activated type information, the mobile terminal further judges whether the type of the activated PDP is the IPv4v6 type or not, determines that the denial cause information does not include any cause if the type of the activated PDP is the IPv4v6 type, records the cause reference information to be "success", generates the dialing success response information according to the obtained cause reference information, otherwise judges whether the failure cause is PDP type IPv6 only allowed or not, records the cause reference information to be "PDP type IPv6 only allowed" if the failure cause is PDP type IPv6 only allowed, deactivates the PDP of the IPv6 type, which has been activated, otherwise judges whether a cause for not activating the IPv4 type is single address bearers only allowed or not, records the cause reference information to be "single address bearers only allowed" if the cause for not activating the IPv4 type is single address bearers only allowed, also records the cause reference information to be "single address bearers only allowed" if the denial cause information does not include any cause, and generates the dialing failure response information according to the obtained cause reference information.

In one embodiment of the present invention, the first dialing instruction is an IPv6 dialing instruction, and that the mobile terminal generates the dialing response information according to the activation reference information includes that:

if determining that the type of the activated PDP is the IPv6 type according to the activated type information, the mobile terminal judges whether the cause for not activating the IPv4 type is PDP type IPv6 only allowed or not according to the denial cause information, records the cause reference information to be "PDP type IPv6 only allowed" if the cause for not activating the IPv4 type is PDP type IPv6 only allowed, otherwise judges whether the cause for not activating the IPv4 type is single address bearers only allowed or not, records the cause reference information to be "single address bearers only allowed" if the cause for not activating the IPv4 type is single address bearers only allowed, also records the cause reference information to be "single address bearers only allowed" if the denial cause information does not include any cause, and generates the dialing success response information according to the obtained cause reference information; and if determining that the type of the activated PDP is not the IPv6 type requested by the first dialing instruction according to the activated type information, the mobile terminal further judges whether the type of the activated PDP is the IPv4v6 type or not, determines that the denial cause information does not include any cause if the type of the activated PDP is the IPv4v6 type, records the cause reference information to be "success", generates the dialing success response information according to the obtained cause reference information, otherwise judges whether the failure cause is PDP type IPv4 only allowed or not, records the cause reference information to be "PDP type IPv4 only allowed" if the failure cause is PDP type IPv4 only allowed, deactivates the PDP of the IPv4 type, which has been activated, otherwise judges whether the cause for not activating the IPv6 type is single address bearers only allowed or not, records the cause reference information to be "single address bearers only allowed" if the cause for not activating the IPv6 type is single address bearers only allowed, also records the cause reference information to be "single address bearers only allowed" if the denial cause information does not include any cause, and generates the dialing failure response information according to the obtained cause reference information.

In one embodiment of the present invention, that the host determines the dialing mode according to the dialing response information includes that:

when determining that the cause reference information included in the dialing failure response information is "unknown PDP address or PDP type", the host falls back to transmit the first dialing instruction for single-stack dialing; and when determining that the cause reference information included in the dialing failure response information is unknown cause, the host transmits another dialing instruction different from the first dialing instruction for dialing.

In one embodiment of the present invention, that the host determines the dialing mode according to the dialing response information includes that:

if the received dialing response information is the dialing success response information, the host does not transmit the IPv6 dialing instruction when determining that the cause reference information included in the dialing success response information is "PDP type IPv4 only allowed", transmits an IPv6 single-stack dialing instruction at a new port when determining that the cause reference information included in the dialing success response information is "single address bearers only allowed", and transmits the IPv6 dialing instruction when determining that the cause reference information included in the dialing success response information is "success"; and if the received dialing response information is the dialing failure response information, the host falls back for IPv6 single-stack dialing when determining that the cause reference information included in the dialing failure response information is "PDP type IPv6 only allowed", and falls back for dual-PDP dual-stack dialing when determining that the cause reference information included in the dialing failure response information is "single address bearers only allowed".

In one embodiment of the present invention, that the host determines the dialing mode according to the dialing response information includes that:

if the received dialing response information is the dialing success response information, the host does not transmit the IPv4 dialing instruction when determining that the cause reference information included in the dialing success response information is "PDP type IPv6 only allowed", transmits an IPv4 single-stack dialing instruction at the new port when determining that the cause reference information included in the dialing success response information is "single address bearers only allowed", and transmits the IPv4 dialing instruction when determining that the cause reference information included in the dialing success response information is "success"; and if the received dialing response information is the dialing failure response information, the host falls back for IPv4 single-stack dialing when determining that the cause reference information included in the dialing failure response information is "PDP type IPv4 only allowed", and falls back for dual-PDP dual-stack dialing when determining that the cause reference information included in the dialing failure response information is "single address bearers only allowed".

In one embodiment of the present invention, the first dialing instruction is the first one transmitted to the mobile terminal by the host.

The present invention also provides a single-PDP dual-stack serial dialing system, including: a host and a mobile terminal, wherein the host includes: a connection management unit configured to transmit a parameter setting command and a first dialing instruction to the mobile terminal and receive dialing response information fed back by the mobile terminal, and a cause analysis processing unit configured to determine a dialing mode according to cause reference information in the dialing response information received by the connection management unit; and the mobile terminal includes: a parameter management unit configured to set a single-PDP dual-stack serial dialing parameter according to the parameter setting command transmitted by the connection management unit of the host, a Session Management (SM) unit configured to initiate a PDP activation request to a mobile communication network according to the first dialing instruction transmitted by the host and the single-PDP dual-stack serial dialing parameter and acquire activation response information fed back by the mobile communication network, and an information feedback unit configured to generate the dialing response information according to the activation response information and feed back the dialing response information to the host through the SM unit, the dialing response information including the cause reference information.

The present invention has the beneficial effects below:

in the present invention, the mobile terminal sets the single-PDP dual-stack serial dialing parameter according to the parameter setting command transmitted by the host, initiates the PDP activation request to the mobile communication network according to the first dialing instruction transmitted by the host and the configured single-PDP dual-stack serial dialing parameter, acquires the activation response information fed back by the mobile communication network, generates the dialing response information according to the activation response information, and feeds back the dialing response information to the host, the fed back dialing response information including the cause reference information; and after receiving the dialing response information, the host can acquire a specific condition of the current mobile network according to the cause reference information included in the dialing response information to determine the dialing mode. For example, when learning about that the current network does not support IPv6 according to the cause reference information, the host can determine that the transmission of the IPv6 dialing instruction is not required any longer in a subsequent process due to the fact that dialing will fail even though the IPv6 dialing instruction is transmitted, so that unnecessary dialing processing and a dialing failure can be avoided, the condition of unnecessarily returning to dual-PDP dual-stack dialing can be avoided, the dialing flow can be simplified, the dialing efficiency can be improved, and the utilization rate of the system resource can be increased.

DETAILED DESCRIPTION OF THE EMBODIMENTS

The present invention is further described below with reference to specific embodiments and the drawings in detail.

Figure 1:
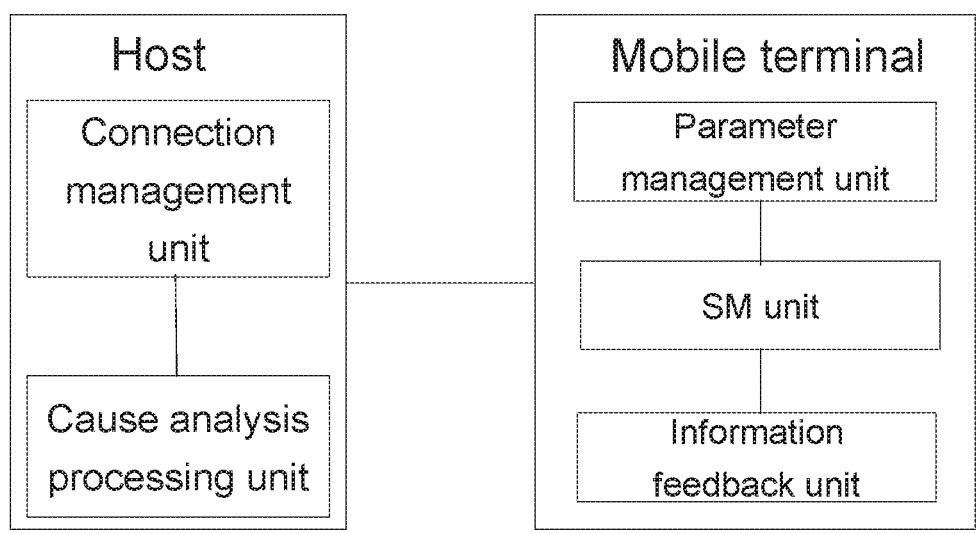
FIG. 1 is a structure diagram of a system for single-PDP dual-stack serial dialing according to an embodiment of the present invention.

As shown in FIG. 1, a single-PDP dual-stack serial dialing system in the embodiment includes a host and a mobile terminal.

The mobile terminal includes a parameter management unit, an SM unit and an information feedback unit, which are sequentially connected, wherein the parameter management unit is configured to receive a parameter setting command from a connection management unit of the host and set and store a single-PDP dual-stack serial dialing parameter according to the command;

the SM unit is configured to initiate a PDP activation request to a mobile communication network according to a first dialing instruction transmitted by the host and the single-PDP dual-stack serial dialing parameter set and stored by the parameter management unit and acquire activation response information fed back by the mobile communication network, wherein the activation response information includes activation results and activation reference information, and the activation reference information further includes an activated type and denial cause information; and the information feedback unit is configured to generate dialing response information according to the activation response information, the generated dialing response information including the activation results and causes for activation failure conditions in various activation results recorded in the activation reference information, and feed back the dialing response information to the host through the SM unit.

The host includes the connection management unit and a cause analysis processing unit connected with the connection management unit, wherein the connection management unit is configured to transmit the parameter setting command and the first dialing instruction to the mobile terminal in communication connection with the connection management unit, the first dialing instruction being the first one transmitted to the mobile terminal by the connection management unit, receive the dialing response information fed back by the mobile terminal, the dialing response information including cause reference information for recording the causes for the activation failure conditions in various activation results, and transmit the received dialing response information to the cause analysis processing unit for processing; and the cause analysis processing unit is configured to learn about a condition of the mobile communication network for current communication according to various causes recorded in the cause reference information of the dialing response information received by the connection management unit and further determine a subsequent dialing mode.

the step that the information feedback unit of the mobile terminal generates the dialing response information according to the activation response information fed back by the mobile communication network can further includes: the information feedback unit of the mobile terminal judges whether PDP activation requested by the first dialing instruction is successful or not according to the activation results included in the activation response information fed back by the network, generates dialing success response information or dialing failure response information according to the activation reference information included in the activation response information if the PDP activation requested by the first dialing instruction is successful, whether the dialing success response information or the dialing failure response information is generated or not specifically being determined by further judging the activated type, and directly generates the dialing failure response information according to the activation reference information if determining that the PDP activation requested by the first dialing request is failed according to the activation results; and the process is specifically as follows:

when the PDP activation requested by the first dialing instruction is successful, that the information feedback unit of the mobile terminal generates the dialing response information according to the activation reference information includes that:

the information feedback unit judges whether a type of an activated PDP is that requested by the first dialing instruction or not according to the activated type information included in the activation reference information, determines that dialing is successful if the type of the activated PDP is that requested by the first dialing instruction, obtains the cause reference information according to the denial cause information included in the activation reference information, generates the dialing success response information, otherwise further judges whether the type of the activated PDP is an IPv4v6 type or not, determines that dialing is successful if the type of the activated PDP is the IPv4v6 type, the denial cause information included in the activation reference information fed back by the network being null at this moment, that is, the denial cause information not including any cause, obtains the cause reference information according to the denial cause information, generates the dialing success response information, determines that dialing fails if the type of the activated PDP is not the IPv4v6 type, obtains the cause reference information according to the denial cause information, and generates the dialing failure response information. The present invention is further described below by taking the conditions that the first dialing instruction is an IPv4 dialing instruction and that the first dialing instruction is an IPv6 dialing instruction as examples respectively:

when the first dialing instruction is the IPv4 dialing instruction, if the type of the activated PDP is determined to be an IPv4 type according to the activated type information, the activated type is that requested by the first dialing instruction, dialing is successful, and the mobile terminal needs to judge whether a cause for not activating an IPv6 type is PDP type IPv4 only allowed or not according to the denial cause information fed back by the network, records the cause reference information to be "PDP type IPv4 only allowed" represented by a code which is set to be 50 in the embodiment if the cause for not activating the IPv6 type is PDP type IPv4 only allowed, otherwise judges whether the cause for not activating the IPv6 type is single address bearers only allowed or not, records the cause reference information to be "single address bearers only allowed" represented by a code which is set to be 52 if the cause for not activating the IPv6 type is single address bearers only allowed, also records the cause reference information to be "single address bearers only allowed" represented by the code which is set to be 52 if the denial cause information does not include any cause, and generates the dialing success response information according to the obtained cause reference information after the cause reference information is obtained according to the abovementioned judgment; and when the first dialing instruction is the IPv4 dialing instruction, if the type of the activated PDP is determined not to be the IPv4 type requested by the first dialing instruction according to the activated type information, whether the type of the activated PDP is the IPv4v6 type or not is further judged, dialing is determined to be successful if the type of the activated PDP is the IPv4v6 type, the denial cause information fed back by the network is null, and does not include any cause, the cause reference information is recorded to be "success", the dialing success response information is generated according to the obtained cause reference information; and if the activated type is not the IPv4v6 type, the activated type is the IPv6 type, dialing is determined to fail, whether a failure cause is PDP type IPv6 only allowed or not is judged, the cause reference information is recorded to be "PDP type IPv6 only allowed" represented by a code which is set to be 51 if the failure cause is PDP type IPv6 only allowed, the PDP of the IPv6 type, which has been activated, is deactivated, otherwise whether a cause for not activating the IPv4 type is single address bearers only allowed or not is judged, the cause reference information is recorded to be "single address bearers only allowed" represented by the code which is set to be 52 if the cause for not activating the IPv4 type is single address bearers only allowed, and is also recorded to be "single address bearers only allowed" represented by the code which is set to be 52 if the denial cause information fed back by the network does not include any cause, and the dialing failure response information is generated according to the obtained cause reference information.

When the first dialing instruction is the IPv4 dialing instruction, if the received dialing response information is the dialing success response information, the host does not transmit the IPv6 dialing instruction when determining that the cause reference information included in the dialing success response information is "PDP type IPv4 only allowed" represented by the code 50, transmits an IPv6 single-stack dialing instruction at a new port when determining that the cause reference information included in the dialing success response information is "single address bearers only allowed" represented by the code 52, and transmits another dialing instruction, i.e. the IPv6 dialing instruction, different from the first dialing instruction when determining that the cause reference information included in the dialing success response information is "success"; and when the first dialing instruction is the IPv4 dialing instruction, if the received dialing response information is the dialing failure response information, the host falls back for IPv6 single-stack dialing when determining that the cause reference information included in the dialing failure response information is "PDP type IPv6 only allowed" represented by the code 51, and falls back for dual-PDP dual-stack dialing when determining that the cause reference information included in the dialing failure response information is "single address bearers only allowed" represented by the code 52.

When the first dialing instruction is the IPv6 dialing instruction, if the type of the activated PDP is determined to be the IPv6 type according to the activated type information, the activated type is that requested by the first dialing instruction, dialing is successful, and the mobile terminal needs to judge whether the cause for not activating the IPv4 type is PDP type IPv6 only allowed or not according to the denial cause information fed back by the network, records the cause reference information to be "PDP type IPv6 only allowed" represented by a code which is set to be 51 in the embodiment if the cause for not activating the IPv4 type is PDP type IPv6 only allowed, otherwise judges whether the cause for not activating the IPv4 type is single address bearers only allowed or not, records the cause reference information to be "single address bearers only allowed" which is represented by the code which is set to be 52 if the cause for not activating the IPv6 type is single address bearers only allowed, also records the cause reference information to be "single address bearers only allowed" which is represented by the code which is set to be 52 if the denial cause information fed back by the network does not include any cause, and generates the dialing success response information according to the obtained cause reference information after the cause reference information is obtained according to the abovementioned judgment; and when the first dialing instruction is the IPv6 dialing instruction, if the type of the activated PDP is determined not to be the IPv6 type requested by the first dialing instruction according to the activated type information, whether the type of the activated PDP is the IPv4v6 type or not is further judged, dialing is determined to be successful if the type of the activated PDP is the IPv4v6 type, the denial cause information fed back by the network is null, and does not include any cause, the cause reference information is recorded to be "success", and the dialing success response information is generated according to the obtained cause reference information; and if the activated type is not the IPv4v6 type, the activated type is the IPv4 type, dialing is determined to fail, whether the failure cause is PDP type IPv4 only allowed or not is judged, the cause reference information is recorded to be "PDP type IPv4 only allowed" represented by a code which is set to be 50 if the failure cause is PDP type IPv4 only allowed, the PDP of the IPv4 type, which has been activated, is deactivated, otherwise whether the cause for not activating the IPv6 type is single address bearers only allowed or not is judged, the cause reference information is recorded to be "single address bearers only allowed" represented by the code which is set to be 52 if the cause for not activating the IPv6 type is single address bearers only allowed, and is also recorded to be "single address bearers only allowed" represented by the code which is set to be 52 if the denial cause information fed back by the network does not include any cause, and the dialing failure response information is generated according to the obtained cause reference information.

When the first dialing instruction is the IPv6 dialing instruction, if the received dialing response information is the dialing success response information, the host does not transmit the IPv4 dialing instruction when determining that the cause reference information included in the dialing success response information is "PDP type IPv6 only allowed" represented by the code 51, transmits an IPv4 single-stack dialing instruction at the new port when determining that the cause reference information included in the dialing success response information is "single address bearers only allowed" represented by the code 52, and transmits another dialing instruction, i.e. the IPv4 dialing instruction, different from the first dialing instruction when determining that the cause reference information included in the dialing success response information is "success"; and when the first dialing instruction is the IPv6 dialing instruction, if the received dialing response information is the dialing failure response information, the host falls back for IPv4 single-stack dialing when determining that the cause reference information included in the dialing failure response information is "PDP type IPv4 only allowed" represented by the code 50, and falls back for dual-PDP dual-stack dialing when determining that the cause reference information included in the dialing failure response information is "single address bearers only allowed" represented by the code 52.

When the PDP activation requested by the first dialing instruction is failed, the activation reference information includes that the activated type can be null because no PDP context is activated; and at this point, the activation reference information can be considered only to include the denial cause information, and under such a condition, that the information feedback unit of the mobile terminal generates the dialing failure response information according to the activation reference information includes below:

judging whether the failure cause is that a PDP address or PDP type of the PDP activation request initiated by the first dialing instruction is unknown according to the denial cause information included in the activation reference information. if yes, recording the cause reference information to be "unknown PDP address or PDP type", which is represented by a code "28" in the present embodiment. Otherwise recording the cause reference information to be "unknown cause", which is represented by a code "None" in the present embodiment, and generating the dialing failure response information according to the recorded cause reference information. At this moment, after receiving the dialing response information fed back by the mobile terminal, the host falls back to transmit the first dialing instruction for single-stack dialing when determining that the cause reference information included in the dialing failure response information is "unknown PDP address or PDP type", and transmits another dialing instruction different from the first dialing instruction for dialing when determining that the cause reference information included in the dialing failure response information is "unknown cause". The first dialing instruction here can also be the IPv4 dialing instruction or the IPv6 dialing instruction.

In order to better understand the present invention, the present invention is further described below with reference to complete method flows by taking an IPv4 dialing instruction and an IPv6 dialing instruction as examples respectively.

Figure 2:
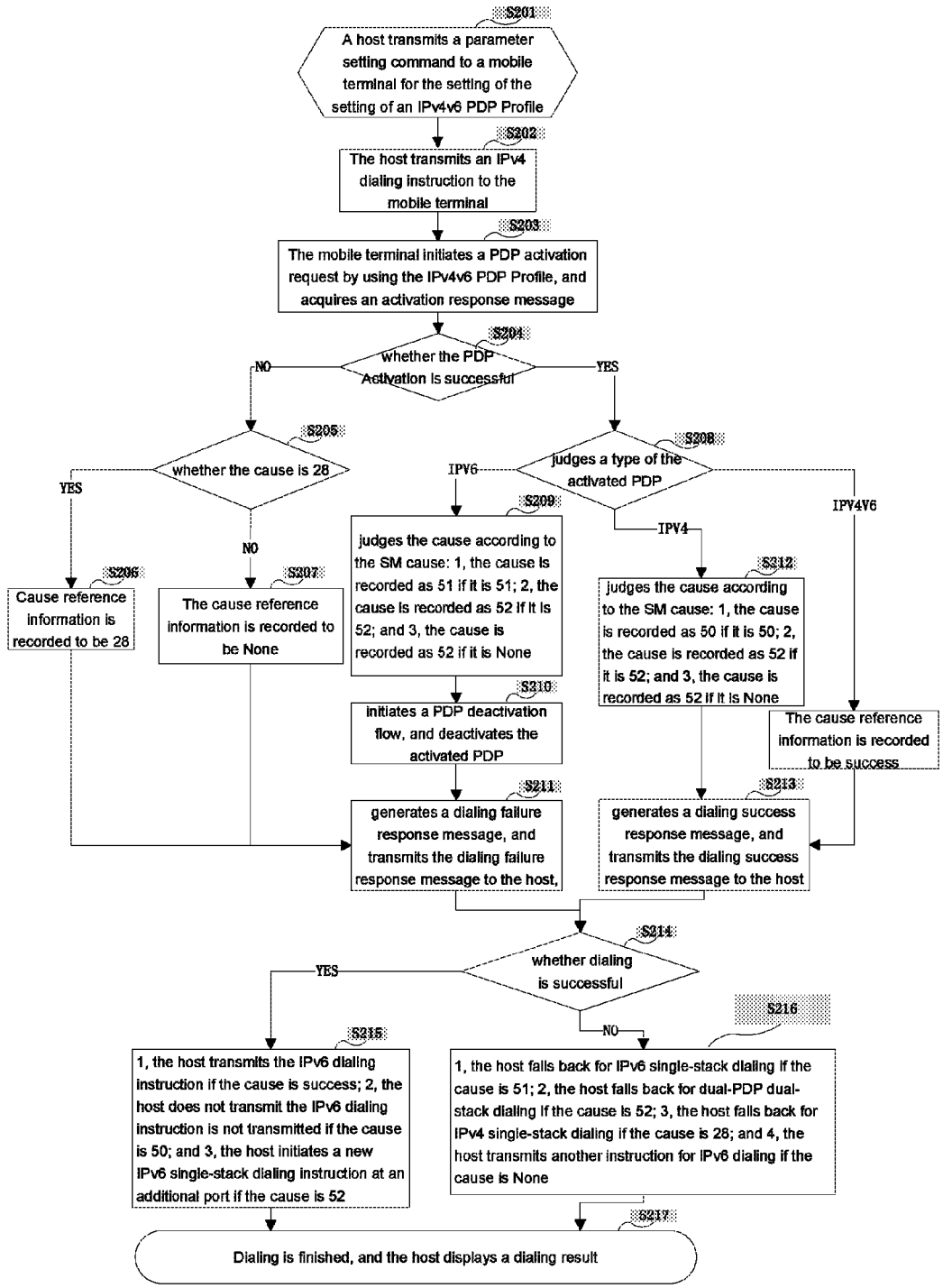
FIG. 2 is a first flowchart of single-PDP dual-stack serial dialing according to an embodiment of the present invention.

As shown in FIG. 2, when a first dialing instruction is the IPv4 dialing instruction, a single-PDP dual-stack serial dialing flow is as follows:

S201: a host (i.e. a PC) transmits a parameter setting command to a mobile terminal for the setting of a single-PDP dual-stack dialing parameter (i.e. an IPv4v6 PDP Profile);

S202: the host transmits the IPv4 dialing instruction (i.e. the first dialing instruction which is the first one transmitted to the mobile terminal by the host) to the mobile terminal, wherein a used PDP profile is specified to be the IPv4v6 PDP Profile set in S201;

S203: the mobile terminal initiates a PDP activation request to a mobile communication network by using the IPv4v6 PDP Profile specified by the host, and acquires an activation response message fed back by the mobile communication network;

S204: the mobile terminal judges whether PDP activation is successful or not according to the activation response message, executes S205 if the PDP activation is failed, otherwise executes S208;

S205: the mobile terminal judges whether denial cause information (SM Cause) included in the activation response message is unknown PDP address or PDP type represented by a code 28 or not, executes S206 if the denial cause information (SM Cause) included in the activation response message is unknown PDP address or PDP type represented by the code 28, otherwise executes S207;

S206: the mobile terminal records the cause reference information to be "28", and then turns to S211;

S207: the mobile terminal records the cause reference information to be "None", and turns to S211;

S208: the mobile terminal judges a type of an activated PDP, executes S209 if the type of the activated PDP is IPv6, executes S212 if the type of the activated PDP is IPv4, and executes S213 if the type of the activated PDP is IPv4v6;

S209: the mobile terminal judges a failure cause according to the SM Cause, records the cause reference information to be the code 51 if the failure cause is PDP type IPv6 only allowed represented by the code 51, and records the cause reference information to be the code 52 if the failure cause is single address bearers only allowed represented by the code 52 or if there is no denial cause, that is, the SM Cause does not include any cause;

S210: the mobile terminal initiates a PDP deactivation flow, deactivates the PDP of the IPv6 type, which has been activated, and turns to S211;

S211: the mobile terminal generates a dialing failure response message, transmits the dialing failure response message to the host, the response message including the cause reference information, and turns to S214;

S212: the mobile terminal judges the failure cause according to the SM Cause, records the cause reference information to be the code 50 if the failure cause is PDP type IPv4 only allowed represented by the code 50, and records the cause reference information to be the code 52 if the failure cause is single address bearers only allowed represented by the code 52 or if there is no denial cause;

S213: if the SM Cause does not include any cause, the cause reference information is recorded to be "success", and the mobile terminal generates a dialing success response message, and transmits the dialing success response message to the host;

S214: the host receives the dialing response message for the first dialing instruction from the mobile terminal, judges whether IPv4 dialing is successful or not, executes S215 if IPv4 dialing is successful, otherwise executes S216;

S215: the host performs processing according to the cause reference information in the dialing success response message: the host transmits the IPv6 dialing instruction if the cause is success, does not transmit the IPv6 dialing instruction if the cause is 51, initiates a new IPv6 single-stack dialing instruction at an additional port if the cause is 52, and then turns to S217;

S216: the host performs processing according to the cause reference information in the dialing failure response message: the host falls back for IPv6 single-stack dialing if the cause is 50, falls back for dual-PDP dual-stack dialing if the cause is 52, falls back for IPv4 single-stack dialing if the cause is 28, and transmits another instruction for IPv6 dialing if the cause is None; and S217: dialing is finished, and the host displays a dialing result.

Figure 3:
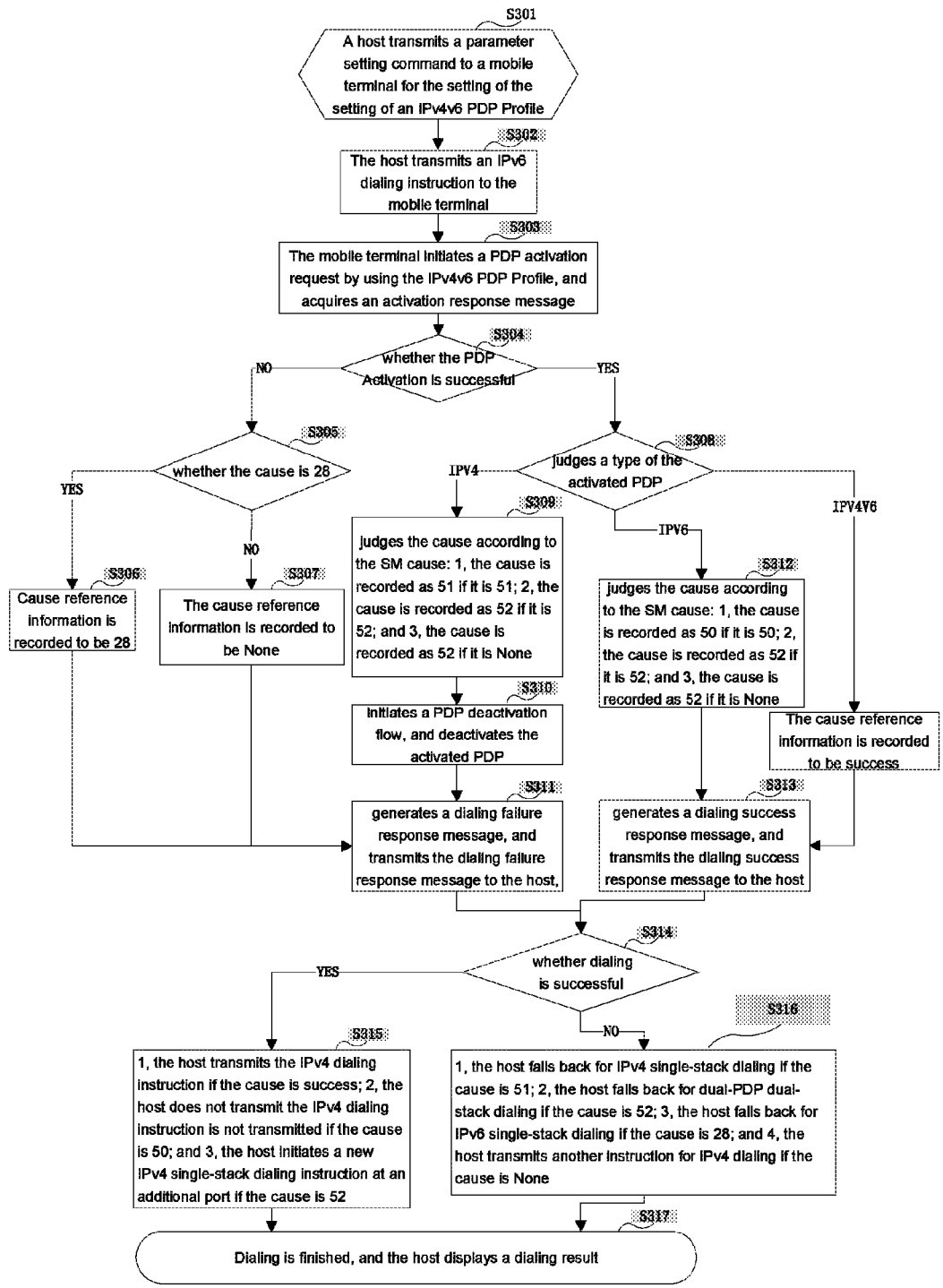
FIG. 3 is a second flowchart of single-PDP dual-stack serial dialing according to an embodiment of the present invention.

The abovementioned flow describes the condition that the IPv4 dialing instruction is transmitted at first during single-PDP dual-stack serial dialing. However, according to different specific embodiments, the host can also transmit the IPv6 dialing instruction at first, and the mobile terminal records the cause information according to an execution result of the IPv6 dialing instruction, and returns the cause information to the host. As shown in FIG. 3, the specific flow is as follows:

S301: the host (i.e. the PC) transmits the parameter setting command to the mobile terminal for the setting of the single-PDP dual-stack dialing parameter (i.e. the IPv4v6 PDP Profile);

S302: the host transmits the IPv6 dialing instruction (i.e. the first dialing instruction which is the first one transmitted to the mobile terminal by the host) to the mobile terminal, wherein the used PDP profile is specified to be the IPv4v6 PDP Profile set in S301;

S303: the mobile terminal initiates the PDP activation request to the mobile communication network by using the IPv4v6 PDP Profile specified by the host, and acquires the activation response message fed back by the mobile communication network;

S304: the mobile terminal judges whether the PDP activation is successful or not according to the activation response message, executes S305 if the PDP activation is failed, otherwise executes S308;

S305: the mobile terminal judges whether the denial cause information (the SM Cause) included in the activation response message is unknown PDP address or PDP type represented by the code 28 or not, executes S306 if the denial cause information (the SM Cause) included in the activation response message is unknown PDP address or PDP type represented by the code 28, otherwise executes S307;

S306: the mobile terminal records the cause reference information to be the code 28, and then turns to S311;

S307: the mobile terminal records the cause reference information to be None, and turns to S311;

S308: the mobile terminal judges the type of the activated PDP, executes S312 if the type of the activated PDP is IPv4, executes S309 if the type of the activated PDP is IPv6, and executes S313 if the type of the activated PDP is IPv4v6;

S309: the mobile terminal judges the failure cause according to the SM Cause, records the cause reference information to be the code 50 if the failure cause is PDP type IPv4 only allowed represented by the code 50, and records the cause reference information to be the code 52 if the failure cause is single address bearers only allowed represented by the code 52 or if there is no denial cause, that is, the SM Cause does not include any cause;

S310: the mobile terminal initiates the PDP deactivation flow, deactivates the PDP of the IPv4 type, which has been activated, and turns to S311;

S311: the mobile terminal generates the dialing failure response message, and transmits the dialing failure response message to the host, the response message including the cause reference information, and turns to S314;

S312: the mobile terminal judges the failure cause according to the SM Cause, records the cause reference information to be the code 51 if the failure cause is PDP type IPv6 only allowed represented by the code 51, and records the cause reference information to be the code 52 if the failure cause is single address bearers only allowed represented by the code 52 or if there is no denial cause;

S313: if the SM Cause does not include any cause, the cause reference information is recorded to be "success", and the mobile terminal generates a dialing success response message, and transmits the dialing success response message to the host;

S314: the host receives the dialing response message for the first dialing instruction from the mobile terminal, judges whether IPv6 dialing is successful or not, executes S315 if IPv6 dialing is successful, otherwise executes S316;

S315: the host performs processing according to the cause reference information in the dialing success response message: the host transmits the IPv4 dialing instruction if the cause is success, does not transmit the IPv4 dialing instruction if the cause is 51, initiates a new IPv4 single-stack dialing instruction at the additional port if the cause is 52, and then turns to S317;

S316: the host performs processing according to the cause reference information in the dialing failure response message: the host falls back for IPv4 single-stack dialing if the cause is 50, falls back for dual-PDP dual-stack dialing if the cause is 52, falls back for IPv6 single-stack dialing if the cause is 28, and transmits another instruction for IPv4 dialing if the cause is None; and S317: dialing is finished, and the host displays a dialing result.

The above is a further detailed description to the present invention with reference to the specific implementation modes and not intended to limit the specific embodiments of the present invention. Those skilled in the art can make various simple deductions or replacements without departing from the concept of the present invention, and these deductions and replacements shall also fall within the scope of protection of the present invention.

What is claimed is:

1. A method for single-Packet Data Protocol (PDP) dual-stack serial dialing, comprising:
    setting, by a mobile terminal, a single-PDP dual-stack serial dialing parameter according to a parameter setting command transmitted by a host;
    initiating, by the mobile terminal, a PDP activation request to a mobile communication network according to a first dialing instruction transmitted by the host and the single-PDP dual-stack serial dialing parameter, and acquiring activation response information fed back by the mobile communication network;
    generating, by the mobile terminal, dialing response information according to the activation response information, and feeding back the dialing response information to the host, wherein the dialing response information comprises cause reference information; and
    determining, by the host, a dialing mode according to the dialing response information;
    wherein the activation response information comprises activation results and activation reference information, and wherein generating, by the mobile terminal, the dialing response information according to the activation response information comprises:
    judging, by the mobile terminal, whether PDP activation is successful or not according to the activation results, generating dialing success response information or dialing failure response information according to the activation reference information if the PDP activation is successful, otherwise generating the dialing failure response information according to the activation reference information.

2. The method for single-PDP dual-stack serial dialing according to claim 1, wherein the activation reference information comprises activated type information and denial cause information, and generating, by the mobile terminal, the dialing response information according to the activation reference information when the PDP activation is successful comprises:
    judging, by the mobile terminal, whether a type of an activated PDP is that requested by the first dialing instruction or not according to the activated type information, obtaining the cause reference information according to the denial cause information if the type of the activated PDP is that requested by the first dialing instruction, generating the dialing success response information, otherwise judging whether the type of the activated PDP is an Internet Protocol version 4 version 6 (IPv4v6) type or not, obtaining the cause reference information according to the denial cause information if the type of the activated PDP is the IPv4v6 type, generating the dialing success response information, the denial cause information comprising any cause at this moment, otherwise obtaining the cause reference information according to the denial cause information, and generating the dialing failure response information.

3. The method for single-PDP dual-stack serial dialing according to claim 1, wherein the activation reference information comprises the denial cause information, and generating, by the mobile terminal, the dialing failure response information according to the activation reference information when the PDP activation is failed comprises:
    according to the denial cause information, the mobile terminal judges whether a failure cause is that a PDP address or PDP type of the PDP activation request which is initiated according to the first dialing instruction is unknown, recording the cause reference information to be "unknown PDP address or PDP type" if the failure cause is that the PDP address or PDP type of the PDP activation request is unknown, otherwise recording the cause reference information to be "unknown cause"; and
    generating, by the mobile terminal, the dialing failure response information according to the recorded cause reference information.

4. The method for single-PDP dual-stack serial dialing according to claim 2, wherein the first dialing instruction is an Internet Protocol version 4 (IPv4) dialing instruction, and generating, by the mobile terminal, the dialing response information according to the activation reference information comprises:
    if the mobile terminal determines that the type of the activated PDP is an IPv4 type according to the activated type information, judging, by the mobile terminal, whether a cause for not activating an Internet Protocol version 6 (IPv6) type is PDP type IPv4 only allowed or not according to the denial cause information, recording the cause reference information to be "PDP type IPv4 only allowed" if the cause for not activating the IPv6 type is PDP type IPv4 only allowed, otherwise judging whether the cause for not activating the IPv6 type is single address bearers only allowed or not, recording the cause reference information to be "single address bearers only allowed" if the cause for not activating the IPv6 type is single address bearers only allowed, also recording the cause reference information to be "single address bearers only allowed" if the denial cause information does not comprise any cause, and generating the dialing success response information according to the obtained cause reference information; and if the mobile terminal determines that the type of the activated PDP is the IPv4 type requested by the first dialing instruction according to the activated type information, further judging, by the mobile terminal, whether the type of the activated PDP is the IPv4v6 type or not, determining that the denial cause information does not comprise any cause if the type of the activated PDP is the IPv4v6 type, recording the cause reference information to be "success", generating the dialing success response information according to the obtained cause reference information, otherwise judging whether the failure cause is PDP type IPv6 only allowed or not, recording the cause reference information to be "PDP type IPv6 only allowed" if the failure cause is PDP type IPv6 only allowed, deactivating the PDP of the IPv6 type, which has been activated, otherwise judging whether a cause for not activating the IPv4 type is single address bearers only allowed or not, recording the cause reference information to be "single address bearers only allowed" if the cause for not activating the IPv4 type is single address bearers only allowed, also recording the cause reference information to be "single address bearers only allowed" if the denial cause information does not comprise any cause, and generating the dialing failure response information according to the obtained cause reference information.

5. The method for single-PDP dual-stack serial dialing according to claim 2, wherein the first dialing instruction is an IPv6 dialing instruction, and generating, by the mobile terminal, the dialing response information according to the activation reference information comprises:

if the mobile terminal determines that the type of the activated PDP is the IPv6 type according to the activated type information, judging, by the mobile terminal, whether the cause for not activating the IPv4 type is PDP type IPv6 only allowed or not according to the denial cause information, recording the cause reference information to be "PDP type IPv6 only allowed" if the cause for not activating the IPv4 type is PDP type IPv6 only allowed, otherwise judging whether the cause for not activating the IPv4 type is single address bearers only allowed or not, recording the cause reference information to be "single address bearers only allowed" if the cause for not activating the IPv4 type is single address bearers only allowed, also recording the cause reference information to be "single address bearers only allowed" if the denial cause information does not comprise any cause, and generating the dialing success response information according to the obtained cause reference information; and if the mobile terminal determines that the type of the activated PDP is the IPv6 type requested by the first dialing instruction according to the activated type information, further judging, by the mobile terminal, whether the type of the activated PDP is the IPv4v6 type or not, determining that the denial cause information does not comprise any cause if the type of the activated PDP is the IPv4v6 type, recording the cause reference information to be "success", generating the dialing success response information according to the obtained cause reference information, otherwise judging whether the failure cause is PDP type IPv4 only allowed or not, recording the cause reference information to be "PDP type IPv4 only allowed" if the failure cause is PDP type IPv4 only allowed, deactivating the PDP of the IPv4 type, which has been activated, otherwise judging whether the cause for not activating the IPv6 type is single address bearers only allowed or not, recording the cause reference information to be "single address bearers only allowed" if the cause for not activating the IPv6 type is single address bearers only allowed, also recording the cause reference information to be "single address bearers only allowed" if the denial cause information does not comprise any cause, and generating the dialing failure response information according to the obtained cause reference information.

6. The method for single-PDP dual-stack serial dialing according to claim 3, wherein determining, by the host, the dialing mode according to the dialing response information comprises:

when the host determines that the cause reference information in the dialing failure response information is "unknown PDP address or PDP type", falling back to transmit the first dialing instruction for single-stack dialing; and when the host determines that the cause reference information in the dialing failure response information is "unknown cause", transmitting, by the host, another dialing instruction different from the first dialing instruction for dialing.

7. The method for single-PDP dual-stack serial dialing according to claim 4, wherein determining, by the host, the dialing mode according to the dialing response information comprises:

if the received dialing response information is the dialing success response information, not transmitting, by the host, the IPv6 dialing instruction when the host determines that the cause reference information in the dialing success response information is "PDP type IPv4 only allowed", transmitting an IPv6 single-stack dialing instruction at a new port when the host determines that the cause reference information in the dialing success response information is "single address bearers only allowed", and transmitting the IPv6 dialing instruction when the host determines that the cause reference information in the dialing success response information is "success"; and if the received dialing response information is the dialing failure response information, falling back for IPv6 single-stack dialing when the host determines that the cause reference information in the dialing failure response information is "PDP type IPv6 only allowed", and falling back for dual-PDP dual-stack dialing when the host determines that the cause reference information in the dialing failure response information is "single address bearers only allowed".

8. The method for single-PDP dual-stack serial dialing according to claim 5, wherein determining, by the host, the dialing mode according to the dialing response information comprises:

if the received dialing response information is the dialing success response information, not transmitting, by the host, the IPv4 dialing instruction when the host determines that the cause reference information in the dialing success response information is "PDP type IPv6 only allowed", transmitting an IPv4 single-stack dialing instruction at the new port when the host determines that the cause reference information in the dialing success response information is "single address bearers only allowed", and transmitting the IPv4 dialing instruction when the host determines that the cause reference information in the dialing success response information is "success"; and if the received dialing response information is the dialing failure response information, falling back for IPv4 single-stack dialing when the host determines that the cause reference information in the dialing failure response information is "PDP type IPv4 only allowed", and falling back for dual-PDP dual-stack dialing when the host determines that the cause reference information in the dialing failure response information is "single address bearers only allowed".

9. The method for single-PDP dual-stack serial dialing according to claim 1, wherein the first dialing instruction is the first one transmitted to the mobile terminal by the host.

10. A system for single-Packet Data Protocol (PDP) dual-stack serial dialing, comprising:
a host; and
a mobile terminal;
wherein the host comprises a first hardware processor and a first memory, wherein the first hardware processor is configured to execute the following programming unit stored in the first memory:
a connection management unit, configured to transmit a parameter setting command and a first dialing instruction to the mobile terminal and receive dialing response information fed back by the mobile terminal, and
a cause analysis processing unit, configured to determine a dialing mode according to cause reference information in the dialing response information received by the connection management unit;
the mobile terminal comprises a second hardware processor and a second memory, wherein the second hardware processor is configured to execute the following programming unit stored in the second memory:
a parameter management unit, configured to set a single-PDP dual-stack serial dialing parameter according to the parameter setting command transmitted by the connection management unit of the host;
a Session Management (SM) unit, configured to initiate a PDP activation request to a mobile communication network according to the first dialing instruction transmitted by the host and the single-PDP dual-stack serial dialing parameter and acquire activation response information fed back by the mobile communication network, and
an information feedback unit, configured to generate the dialing response information according to the activation response information and feed back the dialing response information to the host through the SM unit, the dialing response information comprising the cause reference information;
wherein the activation response information comprises activation results and activation reference information, and the mobile terminal is configured to judge whether PDP activation is successful or not according to the activation results, generate dialing success response information or dialing failure response information according to the activation reference information if the PDP activation is successful, otherwise generate the dialing failure response information according to the activation reference information.

11. The method for single-PDP dual-stack serial dialing according to claim 2, wherein the first dialing instruction is the first one transmitted to the mobile terminal by the host.

12. The method for single-PDP dual-stack serial dialing according to claim 3, wherein the first dialing instruction is the first one transmitted to the mobile terminal by the host.

13. The method for single-PDP dual-stack serial dialing according to claim 4, wherein the first dialing instruction is the first one transmitted to the mobile terminal by the host.

14. The method for single-PDP dual-stack serial dialing according to claim 5, wherein the first dialing instruction is the first one transmitted to the mobile terminal by the host.

15. The method for single-PDP dual-stack serial dialing according to claim 6, wherein the first dialing instruction is the first one transmitted to the mobile terminal by the host.

16. The method for single-PDP dual-stack serial dialing according to claim 7, wherein the first dialing instruction is the first one transmitted to the mobile terminal by the host.

17. The method for single-PDP dual-stack serial dialing according to claim 8, wherein the first dialing instruction is the first one transmitted to the mobile terminal by the host.

* * * * *